(12) United States Patent
Brunnett et al.

(10) Patent No.: US 6,714,376 B1
(45) Date of Patent: Mar. 30, 2004

(54) PARTIAL SERVO WRITE FILL IN

(75) Inventors: Don Brunnett, Pleasanton, CA (US); Lloyd Levy, San Jose, CA (US)

(73) Assignee: Maxtor Corporation, Longmont, CO (US)

(*) Notice: Subject to any disclaimer, the term of this patent is extended or adjusted under 35 U.S.C. 154(b) by 239 days.

(21) Appl. No.: 09/905,564

(22) Filed: Jul. 13, 2001

Related U.S. Application Data

(60) Provisional application No. 60/217,994, filed on Jul. 13, 2000, now abandoned.

(51) Int. Cl.[7] .............................. G11B 21/02
(52) U.S. Cl. ...................................... 360/75
(58) Field of Search ...................... 360/75, 77.08, 360/51, 53, 77.02, 78.04

(56) References Cited

U.S. PATENT DOCUMENTS 6,519,107 B1 * 2/2003 Ehrlich et al. ................. 360/75
6,522,494 B1 * 2/2003 Magee ......................... 360/75

* cited by examiner

Primary Examiner—Andrew L. Sniezek
(74) Attorney, Agent, or Firm—Tejpal S. Hansra

(57) ABSTRACT

A method and apparatus for writing servo information to disks within a disk drive is disclosed. A servo track writer is used to write first servo information to the disks. The disk drive is then sealed, and the read/write heads within the disk drive are used to fill in second servo information. The first servo information includes digital information and A, B, C, and D servo bursts for a first number of tracks on the disks. The first servo information also includes digital information and A and B servo bursts for the remaining tracks on the disks. After the disk drive is sealed in the manufacturing process, the read/write heads within the disk drive fill in the second servo information, which includes C and D servo bursts for the remaining tracks. The read head reads the first servo information in the first number of tracks, and the position of the write head is adjusted based on the first servo information. The write head is then used to write the second servo information to a first remaining track, resulting in complete servo information for the first remaining track. The read head then reads the complete servo information in the first remaining track, and writes the second servo information for a second remaining track. This continues until the complete servo information is propagated to all of the remaining tracks.

33 Claims, 7 Drawing Sheets

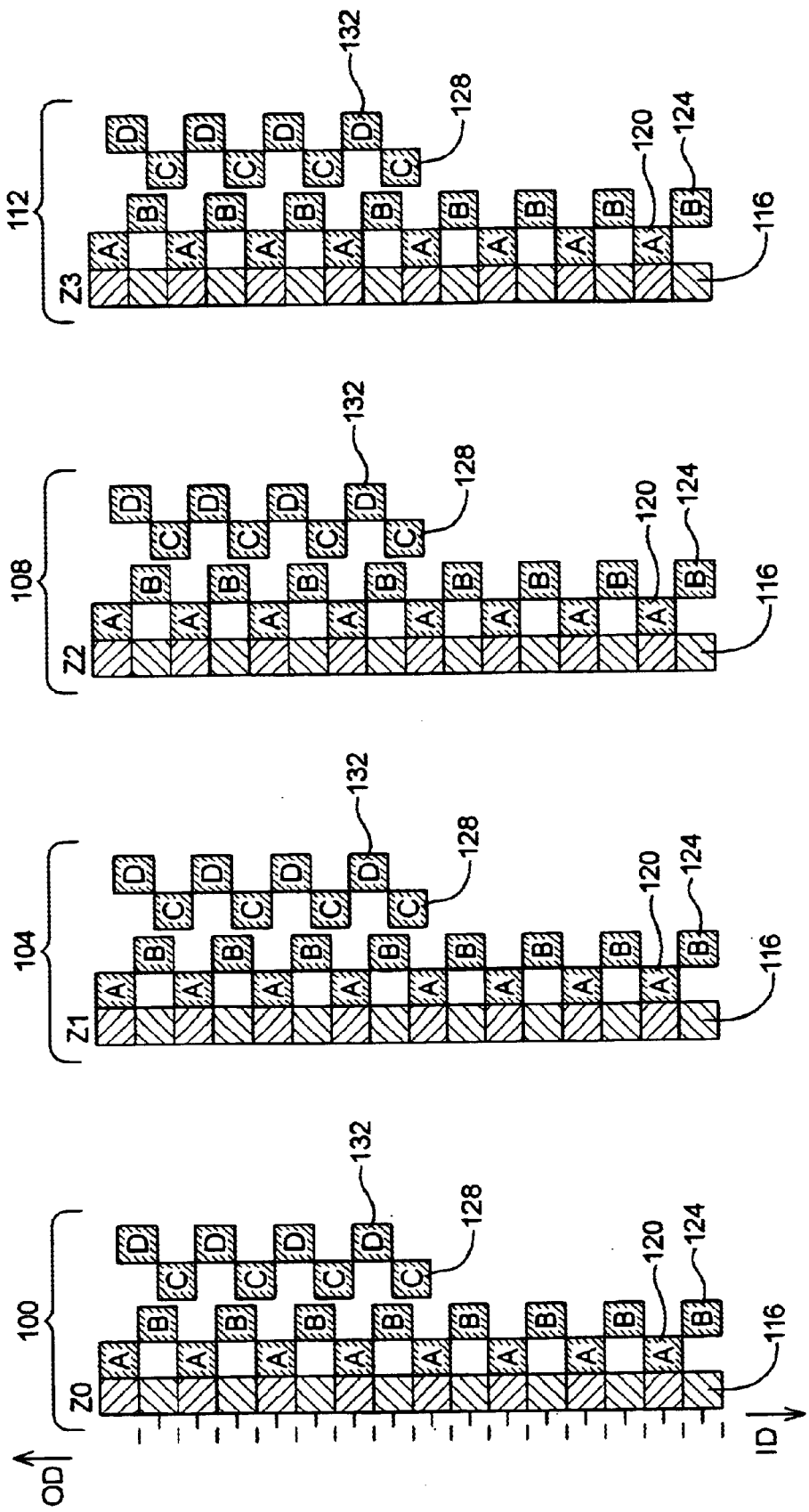

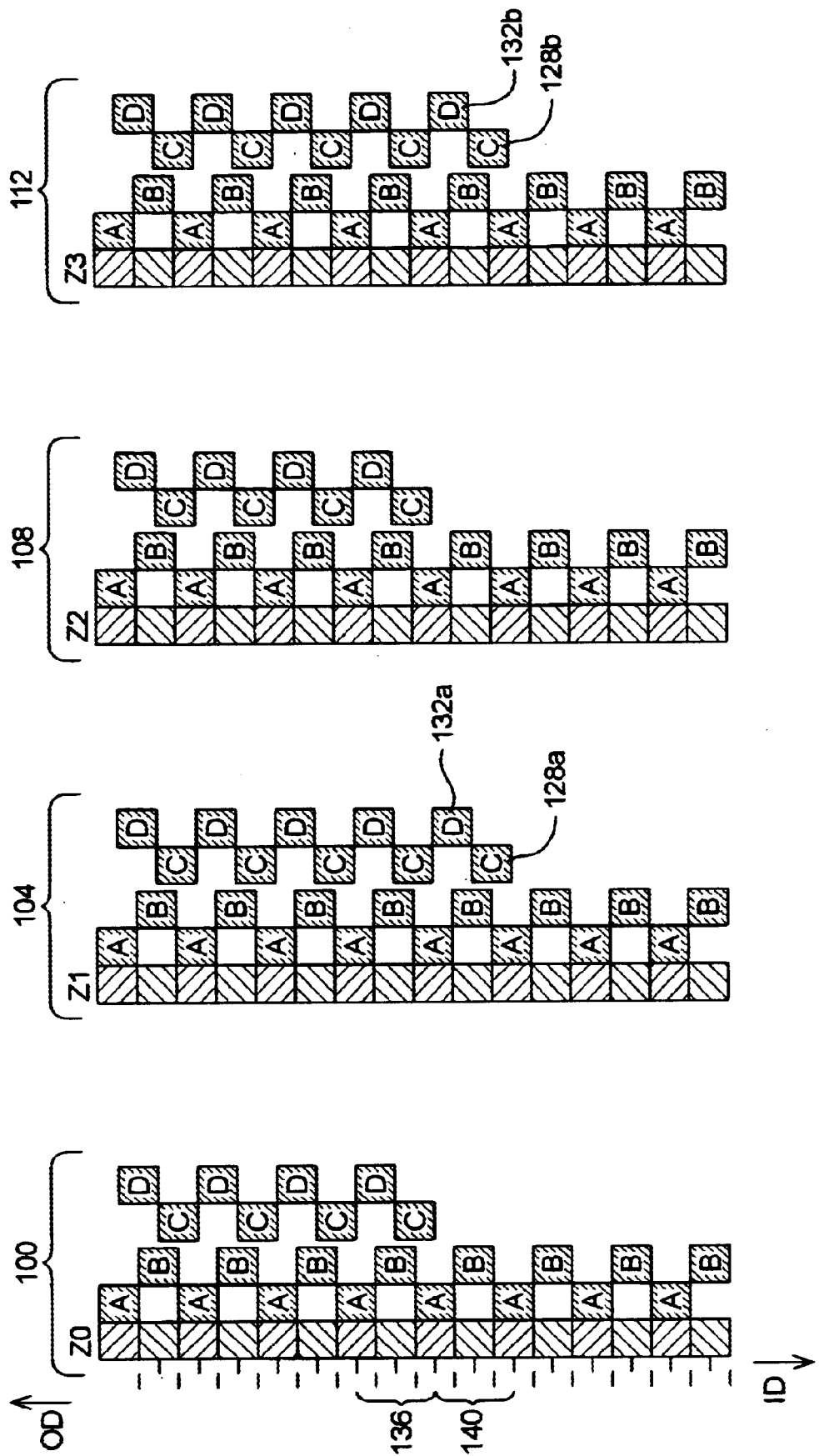

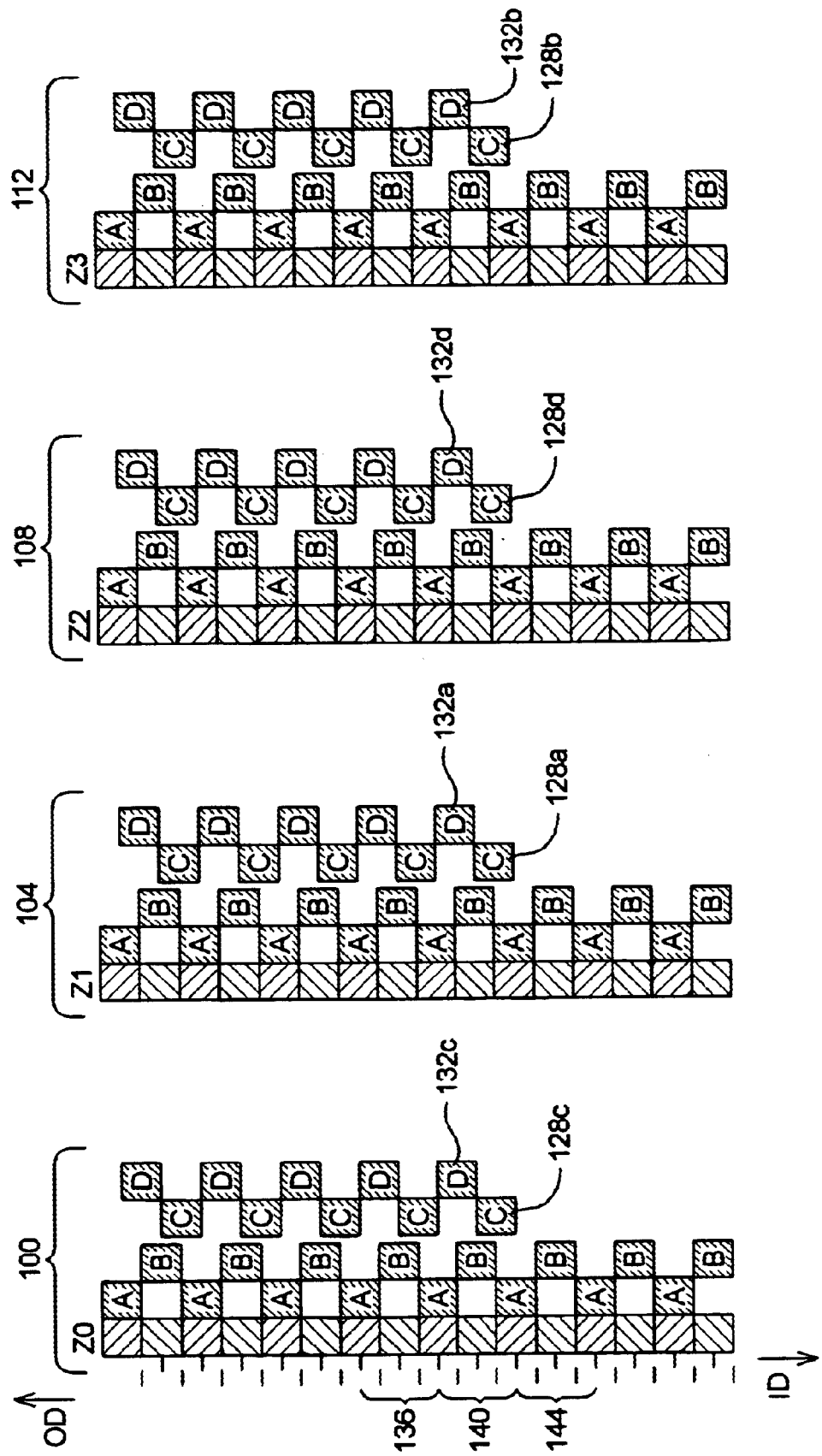

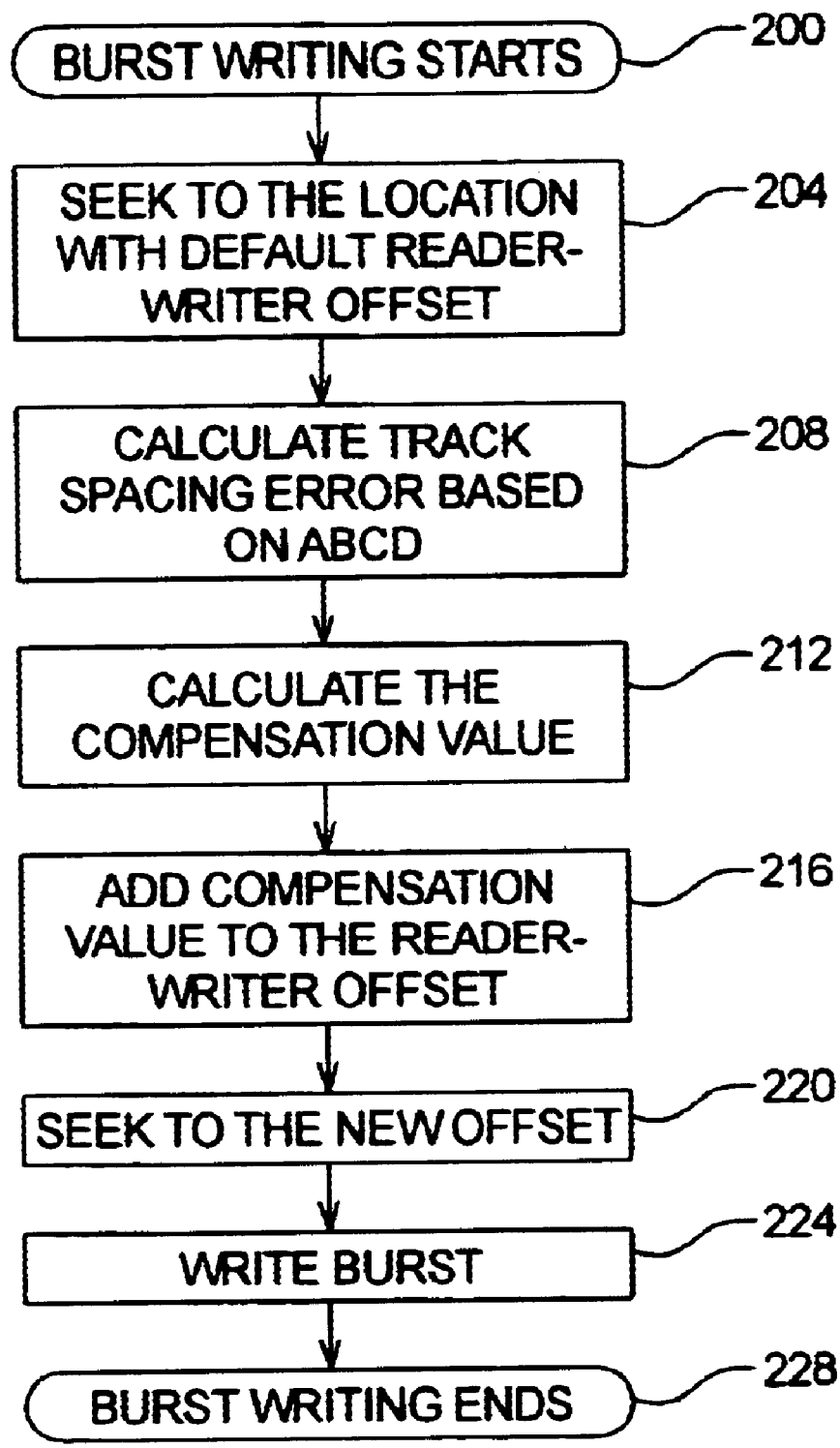

PARTIAL SERVO WRITE FILL IN

Priority is claimed from U.S. Provisional Patent Application No. 60/217,994, filed Jul. 13, 2000 now abandoned entitled "Partial Servo Write Fill In," which is incorporated by reference in its entirety.

FIELD OF THE INVENTION

The present invention relates to servo information for magnetic storage devices and, more particularly, to writing servo information to disks during the manufacturing process.

BACKGROUND OF THE INVENTION

Magnetic heads are used to read data from and write data onto certain data regions of magnetic disks. To accurately perform these operations, it is important that the heads be properly positioned over the data regions. Servo-systems are conventionally used in an attempt to ensure the proper positioning of the heads relative to the data regions. Servo-systems sense the position of the heads and generate position error ("PES") signals to adjust the position of the heads to their respective proper locations over the magnetic disks. The PES signal is generated from a predefined servo pattern which is located at certain points on the disk surface, and will be discussed in more detail below.

A standard disk drive, generally designated 10, is illustrated in FIG. 1. The disk drive comprises a disk 12 that is rotated by a spin motor 14. The spin motor 14 is mounted to a base plate 16. An actuator arm assembly 18 is also mounted to the base plate 16. The actuator arm assembly 18 includes a head 20 mounted to a flexure arm 22, which is attached to an actuator arm 24 that can rotate about a bearing assembly 26. The disk drive 10 also includes a voice coil motor 28 which moves the head 20 relative to the disk 12. The spin motor 14, voice coil motor 28 and head 20 are coupled to a number of electronic circuits 30 mounted to a printed circuit board 32. The electronic circuits 30 typically include a read channel chip, a microprocessor-based controller and a random access memory (RAM) device.

The disk drive 10 typically includes a plurality of disks 12 and, therefore, a plurality of corresponding actuator arm assemblies 18. However, it is also possible for the disk drive 10 to include a single disk 12 as shown in FIG. 1.

Referring now to FIG. 2, data is stored on the disk 12 within a number of concentric radial tracks 40 (or cylinders). Some tracks 40 may solely contain servo information, while other tracks may contain both servo information and data. Typically, however, tracks 40 contain both servo information and data. Each track 40 is divided into a plurality of sectors 42. In tracks 40 which contain both servo information and data, each sector 42 is further divided into a servo region 44 and a data region 46.

The servo regions 44 of the disk 12 are used to, among other things, accurately position head 20 (the head 20 is shown in FIG. 1) so that data can be properly written onto and read from the disk 12. The data regions 46 are where non-servo related data (i.e., user data) is stored and retrieved. Such data, upon proper conditions, may be over-written.

Each track 40 has a centerline 48. To accurately write and read data from the data region 46 of the disk 12, it is desirable to maintain the head 20 in a relatively fixed position with respect to a given track's centerline 48 during each of the writing and reading procedures. For simplicity and for purposes of demonstrating the invention, it will be assumed that the head 20 should be positioned on, or substantially on, a given track's centerline 48 to accurately read data from and write data to the data region 46 of that track 40. It should be noted, however, that the invention described herein is equally applicable to those systems which incorporate a read or write offset from the track centerline, as will be understood by those skilled in the art.

To assist in controlling the position of the head 20 relative to the track centerline 48, the servo region 44 contains, among other things, servo information in the form of servo patterns 50 comprised of groups of servo bursts A, B, C, D as shown in FIG. 3. The servo bursts A, B, C, D are accurately positioned relative to the centerline 48 of each track 40, are typically written on the disk 12 during the manufacturing process using a servo track writer ("STW") and, unlike information in the data region 46, may not be over-written or erased during normal operation of the disk drive 10.

As shown in FIG. 3, the A and B burst pairs define what are conventionally known as the Norms. The difference in amplitude between the A and B bursts at a particular head position is defined as the Norms signal (in units of volts) and is represented by N=A−B. A Norms curve can be developed to represent Norms signals for head positions across an entire track. Likewise, the C and D burst pairs define what are conventionally known as the Quads. The difference in amplitude between the C and D bursts at a particular head position is defined as the Quads signal (in units of volts) and is represented by Q=C−D. A Quads curve can be developed to represent Quads signals for head positions across an entire track.

Traditionally, during the manufacturing process of the disk drive 10, a servo-track writer (not shown) is used to write servo information, including servo bursts A, B, C, D onto each of the servo regions 44 of the disk 12. The servo track writer includes its own write heads which are used to write the servo information to the disks prior to the disks being sealed within the disk drive. The servo track writer is a highly specialized, and high-priced piece of equipment which writes the servo bursts at precise locations on the disk surfaces. It would therefore be advantageous to use as few servo track writers in a manufacturing production line as possible in order to reduce capital costs of additional servo track writers.

As will be understood by those of skill in the art, disk drives are generally manufactured in clean rooms, which provide a manufacturing environment that is largely free of external contamination. Because disks may be exposed during the manufacturing process, it is important to reduce external contamination. External contamination on a disk surface can, in certain situations, damage or degrade the performance of a disk drive. As part of the manufacturing process, the servo-track writer is located in the clean room with the other manufacturing tools which require a clean room environment.

Clean rooms are generally very expensive to construct and operate. Constructing a clean room requires sophisticated manufacturing techniques which are more expensive than construction techniques used for standard, non-clean room construction. Additionally, clean rooms require sophisticated air handling and filtration hardware, which adds to the cost of construction as well as operating costs. Accordingly, it would be advantageous to minimize the size of a clean room, and thus reduce the capital costs of construction and operating costs.

As disk drive technology progresses, more and more information is able to be stored onto a single disk. Accordingly, the number of tracks per inch on a disk is continually increasing. As discussed above, tracks have associated servo information. Therefore, when additional tracks are included on a disk, additional servo information must be written to each disk. This requires additional time for each disk to be in the servo track writer. As a result, additional servo track writers are needed to support the same build rate of drives on a production line as track density increases. Additional servo track writers result in additional capital costs for both the additional equipment, and the additional clean room space required to house the additional equipment. Furthermore, the additional servo track writers may be difficult to fit into an existing facility, possibly resulting in a reduced output capacity for a facility as track density increases.

Some existing solutions to the problem of trying to reduce the number of servo track writers located in a production line are to pre-write disks prior to the manufacturing process which incorporates the disks into disk drives. Such pre-writing may be bulk writing of media to record the servo information, or printing the media using a magnetic printing process to record the servo information on the disks. In both of these solutions, additional equipment is required to write the servo information to the disks. Pre-writing disks requires equipment to write the information on the disks prior to the disk drive manufacturing process. While this is an available alternative, which may save space in a factory, it still requires the capital expense of the writing equipment. Additionally, many manufacturers have an existing investment in servo track writers which are located in factories. Thus, converting to a different type of machine to write servo information would result in a loss of value for the existing installed base of servo track writers. As described above, servo track writers are highly specialized pieces of equipment which have a significant cost. Thus, it would be beneficial for many manufacturers to continue to use their installed base of servo track writers, while increasing the production capacity of such installed base.

Accordingly, there is a need to develop a method for writing servo information to a disk which (1) reduces servo track writer time relative to conventional servo track writing procedures, (2) accurately and reliably writes the servo information to the disk, and (3) requires little or no additional clean room space to accomplish. The present invention, among other things, is designed to meet the aforementioned needs and to overcome the aforementioned problems.

SUMMARY OF THE INVENTION

The present invention relates to a method for encoding servo information onto a hard disk of a hard disk drive. The method requires only a portion of the servo information to be written during the clean room manufacturing process, with the remaining servo information written by the disk drive after assembly. By writing a portion of the servo information during the clean room manufacturing process, fewer servo track writers are required for a given build rate than would be required if all servo information were written during the clean room manufacturing process. This results in a requirement of fewer servo track writers for a given capacity of the manufacturing line, resulting in reduced capital costs for both equipment and clean room space. In addition, the servo track writers occupy less area within the clean room, thus allowing for additional production capacity for a given clean room area.

To achieve the above benefits, the servo track writer writes the gray code, and A, B, C, and D servo bursts for a first number of tracks, and the servo track writer writes the gray code, A and B servo bursts for the remaining tracks. The disk drive is then sealed, and the remaining C and D servo bursts are written to the disk using the read and write heads of the disk drive. Within the disk drive, the read and write heads are situated such that the path of the write head will not overlap the path of the read head for any data track on the disk surface.

When writing the remaining C and D servo bursts, the read head is located in a position ahead of the write head. The read head reads the servo information for a first track, and the position of the actuator arm is adjusted based on the read servo information. The write head is then used to write the C and D servo bursts to a second track. In one embodiment, the read head reads a first servo sector on a first track, the position of the actuator arm is adjusted, and the write head is writes the C and D servo bursts for a second servo sector on a second track. This pattern is continued until all of the servo sectors have been written.

When adjusting the position of the actuator arm, the control electronics within the disk drive move the actuator arm such that the read head is in a default position with respect to the first track by using a default reader-writer offset value. The A, B, C, and D servo bursts from the first track are read by the read head. Track spacing error is calculated based on the magnitude of the signal of the A, B, C, and D servo bursts. A compensation value is calculated based on the spacing error, which is then added to the reader-writer offset value. The position of the actuator arm is then adjusted based on the new offset value. The C and D servo bursts for the second servo sector on the second track are then written.

BRIEF DESCRIPTION OF THE DRAWINGS

FIG. 4A is a diagrammatic representation illustrating a partial servo write in accordance with one embodiment of the present invention;

FIGS. 4B and 4C are diagrammatic representations illustrating the process of filling in servo information to complete the partially written servo sectors in accordance with one embodiment of the present invention;

DETAILED DESCRIPTION

Figure 1:
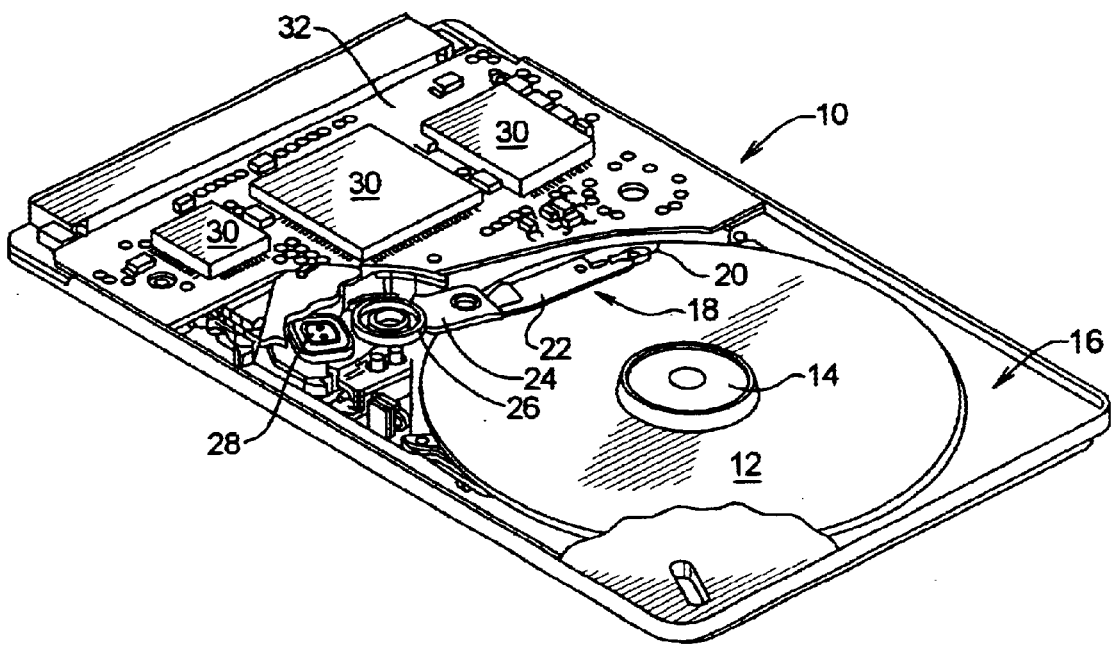
FIG. 1 is a diagrammatic representation of a disk drive.
Figure 2:
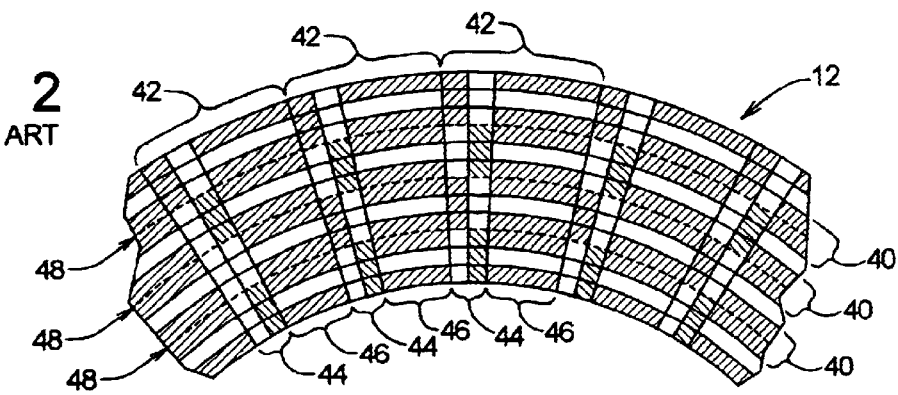
FIG. 2 is a diagrammatic representation of a portion of a disk surface illustrating the location of several data tracks and servo sectors.
Figure 3:
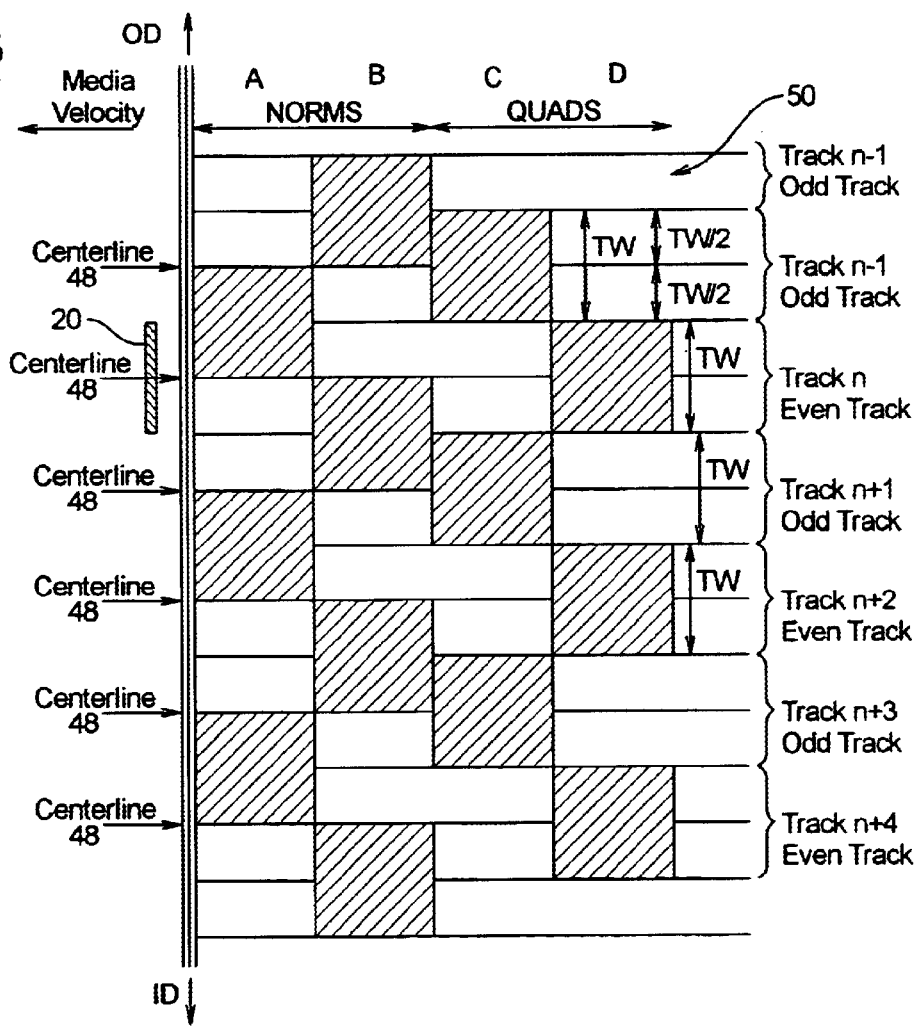
FIG. 3 is a diagrammatic representation illustrating the relative locations of servo bursts within a servo sector for a number of tracks.

In one embodiment, the present invention provides for writing only a portion of servo information using a servo track writer. In this embodiment, the servo track writer is used to write the digital information, including AGC, synchronization, and grey code fields. The servo track writer is also used to write partial servo burst information, with the drive heads filling in the remaining servo burst information following the completion of the assembly of the disk drive.

Referring now to FIG. 4A, a representative pattern written by a servo track writer, in accordance with one embodiment of the present invention, is illustrated. The servo track writer writes an initial pattern to the each of the servo sectors. In the example of FIG. 4A, four servo sectors, 100, 104, 108, 112 are illustrated. The servo sectors 100, 104, 108, 112 are located on a disk surface, with the inner diameter (ID) and outer diameter (OD) of the disk located in the directions indicated. The servo track writer writes all of the digital information 116, including the AGC, synchronization, and grey code fields for each of the servo sectors shown. The servo track writer also writes all of the A servo bursts 120 and all of the B servo bursts 124 for each of the servo sectors shown.

In addition to the digital information 116, A servo bursts 120, and B servo bursts 124, the servo track writer also writes the C servo bursts 128, and D servo bursts 132 for several tracks near the outer diameter of the disk. By not writing the C and D bursts 128, 132 for a significant portion of the disk surface, the amount of time required for the servo track writer to write servo information to the disk is reduced, thereby allowing each servo track writer in a production line to have a higher capacity as compared to a servo track writer used to write all of the servo information for every servo sector of a disk. This benefit is achieved because fewer revolutions of the disk are required to complete a write of the partial servo information for a track than would be required to complete a write of the complete servo information for a track.

For example, in one embodiment, a servo track writer uses three revolutions of a disk to write the complete servo information for a track. Prior to beginning each write, the servo track writer performs a seek function to ensure the write head is in the proper location, with this seek function taking about one-fifth of a revolution, resulting in the servo track writer using approximately 3.6 revolutions per data track to write servo information. If the servo track writer only writes half as much information, it would then require only about 1.8 revolutions per data track to write the partial servo information. Thus, in this embodiment, the number of revolutions required for the servo track writer to write servo information to a disk is reduced by approximately 1.8 revolutions per data track. Consequently, by reducing the number of revolutions per data track where the C and D bursts 128, 132 are not written, the total number of servo track writer revolutions for the entire disk surface is reduced by a significant amount, thereby reducing the amount of time required for each disk drive to be in the servo track writer. It should be understood that the number of revolutions per data track required for a servo track writer to write servo information can be varied, and that three revolutions per data track is just one example of such a servo information writing scheme. Once the disk drive has been sealed, the heads within the disk drive are used to fill in the remaining C and D servo bursts 128, 132 which were not written by the servo track writer.

When writing servo information, the servo track writer is used to write all of the radially aligned servo information. As will be understood by those of skill in the art, when performing a seek function, the position of the read/write heads is first coarsely positioned over an area of the disk surface, and then finely positioned over a particular data track. The digital information 116 is used for this coarse positioning, and the information in the A, B, C, and D servo bursts is then used to finely position the read/write heads.

Thus, the digital information 116 portion of the servo information must be radially coherent from one track to another throughout the entire radius of the disk surface. This is necessary for the coarse positioning function, because the read/write heads may be positioned over a portion of two or more data tracks, and must read the digital information 116 to be able to move the read/write heads in a proper direction. In one embodiment, the radially aligned servo information is written to the disk surface using the servo track writer, and servo information which is not required to be radially aligned is written using the write heads within the disk drive.

When filling in the remaining C and D servo bursts 128, 132 to complete the writing of the servo sectors, the disk drive uses complete servo information that has been written to the disk to position the actuator arm, and writes servo information for the next track over which the read head is located. Within the disk drive, the read and write heads are designed to have an offset, referred to as a head offset, such that the path of the read head does not overlap the path of the write head at any position on the disk surface.

Figure 5:
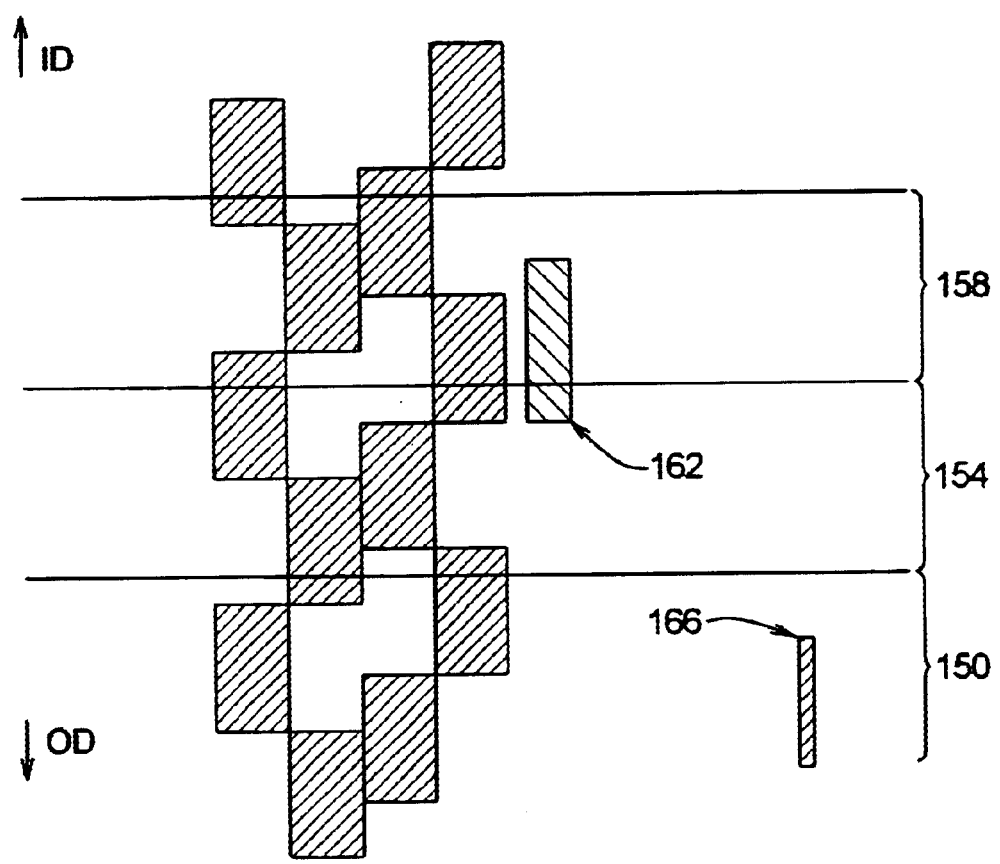
FIG. 5 is a diagrammatic representation illustrating the relative locations of the read and write heads in accordance with one embodiment of the present invention; and, FIG. 6 is a flow chart representation of a track spacing calibration which is used when filling in servo information to complete the partially written servo sectors in accordance with one embodiment of the present invention.

Referring now to FIG. 5, the head offset of one embodiment is illustrated. A representative servo pattern for several tracks 150, 154, 158 of data with the relative positions of the write head 162 and the read head 166 is illustrated. The inner diameter (ID) and outer diameter (OD) of the disk located in the directions indicated. As can be seen from the drawing, the write head 162 in this embodiment is located such that it is farther toward the inner diameter of the disk than the read head 166. This allows the write head 162 to be located over a different track than the read head 166. In this manner, when filling in the remaining servo bursts, the read head 166 is used to read the complete servo information for a first track 150 located toward the outer diameter of the disk surface relative to a track toward the inner diameter 154, 158 over which the write head 162 is located. The write head 162 can then be used to write the C and D servo bursts for the track over which it is located, which may be the track adjacent to the first track or, depending upon the head offset, one or more tracks inward of the first track. As will be understood, it is therefore important to design the head offset such that the path of the write head 162 and the path of the read head 166 do not overlap for any track on the disk. This is because if the write and read heads 162, 166 are over the same track of data, the servo information written by the write head 150 may overwrite the servo information existing on that track.

Referring now to FIGS. 4B through 4C, an example of the servo burst fill in procedure is described. In this embodiment, the disk drive positions the actuator arm based on servo information located in servo sectors 100, 108. Once the actuator arm is positioned properly, as will be described in more detail below, the write head is then used to write the C and D burst information for servo sectors 104, 112. Thus, the servo information is read for track n 136 for sectors 100, 108, and servo information is written for track n+1 140 for sectors 104, 112.

Specifically, with reference to FIG. 4B, the read head reads the servo information located in track n 136 in the first servo sector 100. The actuator arm is positioned based on this servo information. The write head then writes the C servo burst 128a and the D servo burst 132a for track n+1 140 of the second servo sector 104. The read head then reads the servo information located in track n 136 in the third servo sector 108. The actuator arm is positioned based on this servo information. The write head then writes the C servo burst 128b and D servo burst 132b for track n+1 140 of the fourth servo sector 112.

Referring now to FIG. 4C, servo sectors 100, 108 are next filled in for track n+1 140. The read head reads the servo information for track n 136 from the servo sector preceding the first servo sector 100. The actuator arm is positioned based on this servo information. The write head then writes the C servo burst 128c and the D servo burst 132c for track n+1 140 of the first servo sector 100. The read head then reads the servo information for track n 136 from the second servo sector 104. The actuator arm is positioned based on this servo information. The write head then writes the C servo burst 128d and the D servo burst 132d for track n+1 140 of the third servo sector 108. This same routine is continued until all of the servo sectors are written for track n+1 140. Once track n+1 140 has all of its servo sectors written, the actuator arm is moved such that the read head reads servo information from track n+1 140, and the write head writes servo information for track n+2 144. In this manner, the servo information is filled in for the entire disk surface.

In one embodiment, when the servo track writer writes the servo information to the disk, it writes twice as many servo sectors as will be present when the disk drive is shipped to a customer. For example, it is common for a disk to have 180 servo sectors written in each track on the disk surface and which are used during normal operation for positioning the actuator arm. In this embodiment, during the manufacturing process 360 servo sectors, are written to the disk surface by the servo track writer. By writing additional servo sectors, the position of the actuator arm is controlled more precisely during the fill in process than it would if a reduced number of servo sectors were present. The additional servo sectors thus help ensure that the fill-in of the servo information is done accurately, and with reduced errors which may result from, for example, vibration of the disk drive during the fill-in process. In this embodiment, once the C and D servo sectors are filled in for the entire disk surface, the additional servo sectors are overwritten, and thus available for storage of customer data.

It should be understood that the amount of additional servo sectors on the disk surface could be adjusted, depending upon the requirements of the disk drive and the limitations of the servo mechanism of the disk drive. For example, four times the number of servo sectors could be written, or one-third more servo sectors could be written. Alternatively, no additional servo sectors could be written, thus allowing the fill in process to be conducted using only the servo sectors that will be present when the disk drive has completed the manufacturing and testing process.

As described above, the read head reads servo information from a track located to the outer diameter of the disk compared to the track to which servo information is being written by the write head. Also, as discussed above, the read head reads complete servo information, including all four servo bursts 120, 124, 128, 132. Thus, when writing the partial servo information using the servo track writer, the complete servo pattern is written for a certain number of tracks located at the outer diameter of the disk. The amount of complete servo information that needs to be written to the tracks on the outer diameter of the disk depends upon the offset of the read and write heads at that location. For example, if at the outer diameter, the write head is located two tracks closer to the inner diameter of the disk than the read head, complete servo information would have to be written for the first two tracks on the disk surface. Thus, when filling in the servo information, the disk drive would position the actuator arm using the servo information located on the first track while filling in the servo information of the third track. Once the third track has all of the servo information filled in, the disk drive would use the servo information written on the second track to position the actuator arm while filling in the servo information for the fourth track.

When positioning the actuator arm, the disk drive uses servo information read by the read head. When positioning the actuator arm, the read/write offset is accounted for using standard techniques which are well known in the art.

Referring now to FIG. 6, a flow chart representation of the calibration for track spacing is now described. As indicated at block 200, the disk drive begins burst writing to fill in the C and D servo bursts. The actuator arm seeks to the track location with the default reader-writer offset, as indicated by block 204. This seek is performed using the complete servo pattern of a data track located toward the outer diameter of the disk surface compared to the location of the write head. Next, the track spacing error is calculated based on the signals received from the A, B, C, and D servo bursts, as indicated at block 208. Next, at block 212, a compensation value is calculated. This compensation value is added to the reader-writer offset, as indicated at bock 216. Then, at block 220, the actuator arm seeks to the new offset. Once this seek is completed, the C and D servo bursts are written. The burst write is then ended, as indicated at block 228.

Occasionally, when writing the C and D servo bursts to the disk surface, the disk drive may encounter an error. The error may be a missing servo sector, known as a single surface missing servo (SSMS), where the servo track writer did not write a servo sector (e.g., a high-fly write during servo track writing). In such a situation, in one embodiment, if the number of missing servo sectors is a relatively small number, the fill in of the associated sectors is skipped. If an entire track is missing, the fill in may be stopped, and the actuator arm may be moved to a safe zone. ,In one embodiment, safe zones are included on the disk surface when the servo track writer writes the servo pattern. The servo track writer writes the full servo information for these safe zones, which, in one embodiment is every 100 tracks. Thus, in such a situation, servo information for a number of tracks will not be filled in. Alternatively, in one embodiment, the servo write will continue, with the write head writing all of the servo information for the tracks which have missing servo information. Likewise, other errors may occur, such as bumps and/or bad head geometry. These types of errors are also encountered during normal operation of a disk drive, and are recovered from using standard error recovery techniques, which are well known in the art.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method for writing servo information to a hard disk in a disk drive, comprising:

firstly reading a first servo pattern on said hard disk using a read head located on an actuator arm within said disk drive;

writing a second servo pattern to said hard disk using a write head located on said actuator arm, said first and second servo patterns combining to form complete servo information for said hard disk, wherein said write head is offset from said read head such that during said writing step said read head reads complete servo information and said write head writes servo information at a location different than said complete servo information.

2. A method, as claimed in claim 1, further comprising:
initially writing said first servo pattern to said hard disk using a servo track writer.

3. A method, as claimed in claim 1, wherein said writing step comprises:
reading complete servo information from a first track using said reader;
adjusting a position of said actuator arm based on said reading step;
writing servo information to a second track using said writer, resulting in said second track having complete servo information, and
repeating said reading, adjusting, and writing steps until substantially all tracks on said hard disk have complete servo information.

4. A method, as claimed in claim 3, wherein said complete servo information includes digital information and A, B, C, and D servo bursts.

5. A method, as claimed in claim 3, wherein said adjusting step comprises:
firstly calculating a track spacing error based on said reading step;
secondly calculating a compensation value based on said firstly calculating step;
adding said compensation value to a reader-writer offset to get a new offset; and
adjusting said actuator arm position to said new offset.

6. A method, as claimed in claim 1, wherein said first servo pattern includes complete servo information for at least a first track.

7. A method, as claimed in claim 1, wherein said first servo pattern includes complete servo information for at least a first track, and partial servo information for remaining tracks.

8. A method, as claimed in claim 1, wherein said first servo pattern includes complete servo information for a first track, and at least one safe zone, said at least one safe zone including at least one track having complete servo information.

9. A method, as claimed in claim 8, further comprising:
monitoring said writing step for an error, and
positioning said head over said safe zone in the upon detection of an error and continuing said writing step.

10. A method, as claimed in claim 9, wherein said error includes a single surface missing servo condition.

11. A method for writing servo information to a hard disk in a disk drive, comprising:
firstly writing first servo information to said hard disk using a servo track writer;
reading said first servo information using a read head located within said disk drive;
positioning an actuator arm within said disk drive; and
secondly writing second servo information to said hard disk using a write head located within said disk drive, said second servo information being different than said first servo information.

12. A method, as claimed in claim 11, wherein:
said first servo information includes digital information and A, B, C, and D servo burst patterns for a first number of tracks on said hard disk, and A and B servo burst patterns for remaining tracks on said hard disk, said remaining tracks including at least a first remaining track and a second remaining track.

13. A method, as claimed in claim 12, wherein said reading step includes:
reading said first servo information from at least one of said first number of tracks using a read head located within said disk drive.

14. A method, as claimed in claim 13, wherein said positioning step includes:
coarsely positioning said actuator arm based on said digital information; and
finely positioning said actuator arm based on information in said A, B, C, and D servo burst patterns.

15. A method, as claimed in claim 14, wherein said finely positioning step comprises:
firstly calculating a track spacing error based on said reading step;
secondly calculating a compensation value based on said firstly calculating step;
adding said compensation value to a reader-writer offset to get a new offset; and
adjusting said actuator arm position to said new offset.

16. A method, as claimed in claim 12, wherein said secondly writing step further includes:
secondly reading said digital information and A, B, C, and D servo burst patterns from at least said first remaining track using said read head;
secondly positioning said write head based on said secondly reading step; and
writing said C and D servo burst patterns to said second remaining track using said write head.

17. A method, as claimed in claim 16, wherein said secondly positioning step comprises:
firstly calculating a track spacing error based on said reading step;
secondly calculating a compensation value based on said firstly calculating step;
adding said compensation value to a reader-writer offset to get a new offset; and
adjusting said actuator arm position to said new offset.

18. A method, as claimed in claim 11, wherein:
said first servo information includes at least digital information and A and B servo burst patterns.

19. A method, as claimed in claim 18, wherein said positioning step includes:
coarsely positioning said actuator arm based on said digital information; and
finely positioning said actuator arm based on at least said A and B servo bursts.

20. A method, as claimed in claim 19, wherein said finely positioning step comprises:
firstly calculating a track spacing error based on at least said A and B servo bursts;
secondly calculating a compensation value based on said firstly calculating step;
adding said compensation value to a reader-writer offset to get a new offset; and
adjusting said actuator arm position to said new offset.

21. A method, as claimed in claim 19, wherein said second servo information includes C and D servo burst patterns.

22. A method, as claimed in claim 11, wherein:

said read head is located in a position relative to said write head such that a read path of said read head does not overlap a write path of said write head for any location on said hard disk.

23. A disk drive, comprising:

at least one hard disk having a plurality of data tracks, said plurality of data tracks having a plurality of servo sectors, wherein said servo sectors include servo information including at least digital information, A, B, C and D servo bursts;

an actuator arm including at least a read head and a write head, wherein said read head is displaced from said write head in an amount sufficient to prevent a read path of said read head from overlapping a write path of said write head; and a control subsystem, said control subsystem operable to control said actuator arm and read and write heads to write at least a portion of said servo information.

24. A disk drive, as claimed in claim 23, wherein:

said control subsystem is operable to read said servo sectors from a first data track, and to write at least said C and D servo bursts to a second data track.

25. A disk drive, as claimed in claim 24, wherein said second data track is located in close proximity to said write head, and said first data track is located in close proximity to said read head.

26. A disk drive, as claimed in claim 24, wherein:

said control system is operable to adjust the position of said actuator arm based on said servo sectors from said first data track.

27. A disk drive, as claimed in claim 26, wherein said control system is operable to:

calculate a track spacing error based on said servo sectors from said first data track;

calculate a compensation value based on said spacing error;

add said compensation value to a reader-writer offset, to get a new offset; and adjust said actuator arm position to said new offset.

28. A method of propagating a servo pattern on a hard disk, comprising:

firstly reading a complete first servo pattern located in a first data track;

firstly positioning a head based on said reading step;

firstly writing at least a portion of a second servo pattern for a second data track in a different radial and time position than said complete first servo pattern to result in a complete second servo pattern.

29. A method, as claimed in claim 28, further comprising:

secondly reading a complete third servo pattern located in said first data track;

secondly positioning said head based on said secondly reading step;

secondly writing at least a portion of a fourth servo pattern for said second data track in a different radial and time position than said complete third servo pattern to result in a complete fourth servo pattern.

30. A method, as claimed in claim 29, wherein said firstly positioning step comprises:

firstly calculating a track spacing error based on said firstly reading step;

secondly calculating a compensation value based on said firstly calculating step;

adding said compensation value to a reader-writer offset to get a new offset; and adjusting said head to said new offset.

31. A method, as claimed in claim 29, further comprising:

thirdly reading said complete second servo pattern in said second data track;

thirdly positioning said head based on said thirdly reading step; and thirdly writing at least a portion of a fifth servo pattern for a third data track in a different radial and time position than said complete second servo pattern to result in a complete fifth servo pattern.

32. A method, as claimed in claim 28, further comprising:

initially writing said complete first servo pattern using a servo track writer.

33. A method, as claimed in claim 28, wherein a portion of said second servo pattern is existing on said hard disk prior to said firstly writing step.

* * * * *